United States Patent [19]

Schramm

[11] Patent Number: 4,670,848

[45] Date of Patent: Jun. 2, 1987

[54] ARTIFICIAL INTELLIGENCE SYSTEM

[75] Inventor: David A. Schramm, Tampa, Fla.

[73] Assignee: Standard Systems Corporation, Tampa, Fla.

[21] Appl. No.: 722,712

[22] Filed: Apr. 10, 1985

[51] Int. Cl.[4] .......................... G06F 15/18; G06K 9/62
[52] U.S. Cl. ..................................... 364/513; 364/200; 364/900; 382/15
[58] Field of Search ............... 364/513, 400, 401, 402, 364/200 MS File, 900 MS File, 300; 382/14, 15

[56] References Cited

U.S. PATENT DOCUMENTS

| 3,950,733 | 4/1976 | Cooper et al. | 364/200 |
| 4,254,474 | 3/1981 | Cooper et al. | 364/900 |
| 4,286,330 | 8/1981 | Isaacson | 364/300 X |
| 4,450,530 | 5/1984 | Llinas et al. | 364/513 |
| 4,558,413 | 12/1985 | Schmidt et al. | 364/300 |
| 4,591,983 | 5/1986 | Bennett et al. | 364/468 X |
| 4,593,367 | 6/1986 | Slack et al. | 364/513 |

Primary Examiner—Joseph Ruggiero
Attorney, Agent, or Firm—Antonelli, Terry & Wands

[57] ABSTRACT

An artificial intelligence system for accepting a statement, understanding the statement and making a response to the statement based upon at least a partial understanding of the statement. The system is characterized by its interaction with a user, which may be a person or machine, in gathering additional statements through inquiries to develop the most specific understanding possible by matching of the statements with a data base.

20 Claims, 7 Drawing Figures

Microfiche Appendix Included
(162 Microfiche, 1 Pages)

FIG. 3A.

| State Set | patterns | default | concepts | neither | both | concept | no concept | STATEMENT | HELP | END | Accepting Types |
|---|---|---|---|---|---|---|---|---|---|---|---|
| Input type | A | A | A | A | B | B | C | C | C | ABC | |
| 0. no patterns, no default, no stmts, no concepts | 14 | 12 | 0 | 16 | | | | | | | A |
| 1. no patterns, new default, new stmts, no concepts | 7 | E | E | 9 | | | | | | | A |
| 2. old pattern, new default, old stmts, no concepts | 7 | 13 | 0 | 9 | | | | | | | A |
| 3. old pattern, no default, old stmts, new concept | 8 | 19 | 0 | 11 | | | | | | | A |
| 4. old pattern, old default, old stmts, new concept | 8 | 19 | 0 | 11 | | | | | | | A |
| 5. no pattern, new default, old stmts, old concept | 8 | 19 | 0 | 11 | | | | | | | A |

FIG. 3B.

| State Set | patterns | default concepts | neither | both | concept | no concept | STATEMENT | HELP | END | Accepting Types |
|---|---|---|---|---|---|---|---|---|---|---|
| 6. no pattern<br>new default<br>new stmts<br>old concept | 8 | 5 | E | 11 | | | | | | A |
| 7. pattern<br>no default<br>stmts<br>no concepts | | | | | 3 | 15 | | | | B |
| 8. pattern<br>no default<br>stmts<br>old concept | | | | | 3 | 17 | | | | B |
| 9. new pattern<br>new default<br>stmts<br>no concepts | | | | | 4 | 2 | | | | B |
| 10. old pattern<br>old default<br>new stmts<br>no concepts | | | | | 5 | 18 | | | | B |
| 11. pattern<br>default<br>stmts<br>concepts | | | | | 4 | 18 | | | | B |
| 12. no patterns<br>new default<br>no stmts<br>no concepts | | | | | | | 1 | 12 | 0 | C |
| 13. no patterns<br>new default<br>old stmts<br>no concepts | | | | | | | 1 | 13 | 0 | C |

FIG. 3C.

| State Set | patterns | default | concepts | neither | both | concept | no concept | STATEMENT | HELP | END | Accepting | Types |
|---|---|---|---|---|---|---|---|---|---|---|---|---|
| 14. new pattern, no default, no stmts, no concepts | | | | | | | | 7 | 14 | 0 | | C |
| 15. old pattern, no default, old stmts, no concepts | | | | | | | | 7 | 15 | 0 | | C |
| 16. new pattern, new default, no stmts, no concepts | | | | | | | | 9 | 16 | 0 | | C |
| 17. old pattern, no default, old stmts, old concept | | | | | | | | 8 | 17 | 0 | | C |
| 18. old pattern, old default, old stmts, old concept | | | | | | | | 11 | 18 | 0 | | C |
| 19. no pattern, new default, old stmts, old concept | | | | | | | | 6 | 19 | 0 | | C |

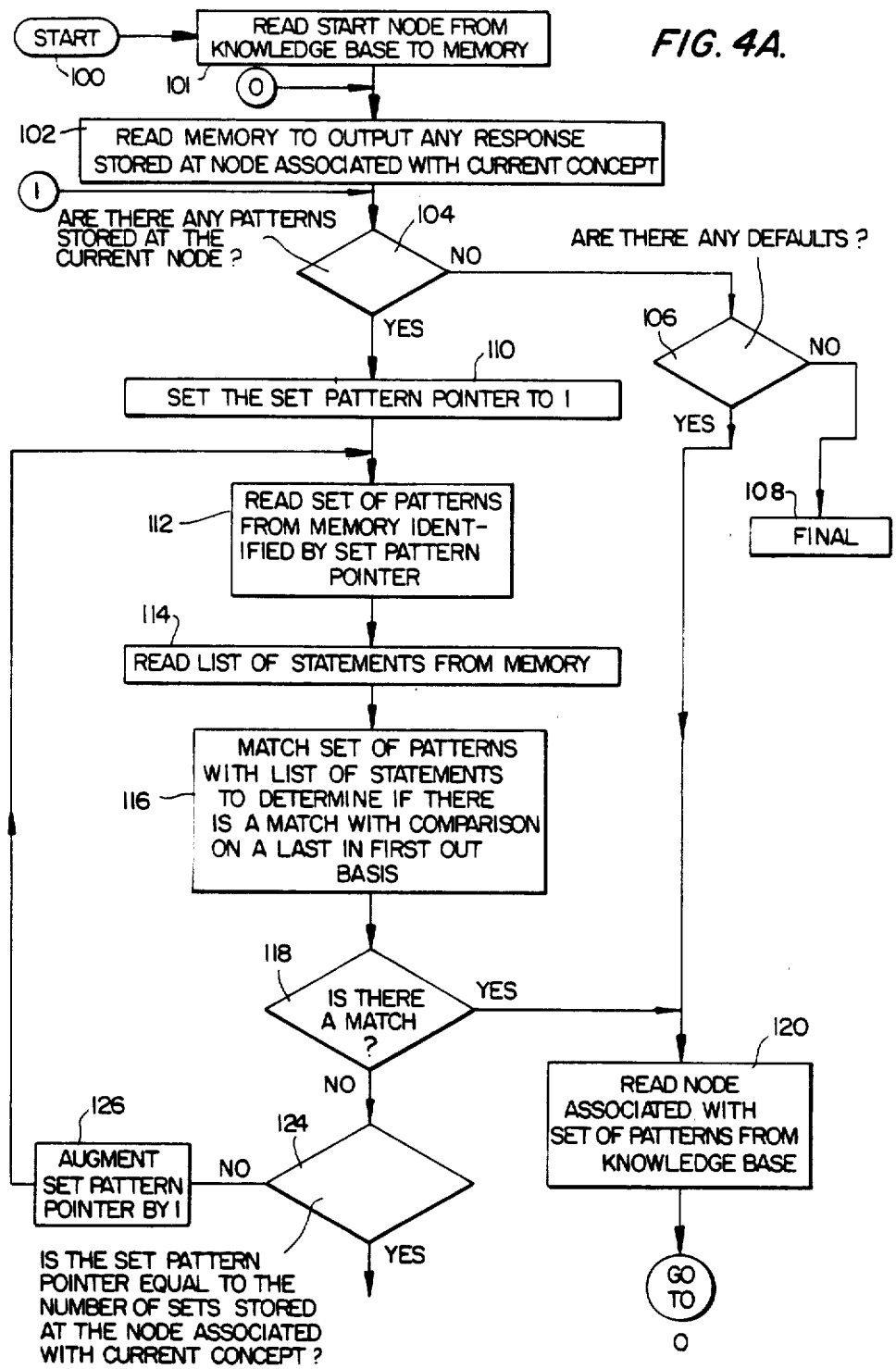

ARTIFICIAL INTELLIGENCE SYSTEM

MICROFICHE APPENDIX

A microfiche appendix containing a source code listing of an example of the present invention containing 1 microfiche having a total of 162 frames is attached hereto. The microfiche appendix contains subject matter which is copyrighted. A limited license is granted to anyone who requires a copy of the program disclosed therein for purposes of understanding or analyzing the present invention, but no license is granted to make a copy for any other purpose, including the loading of a computer with code in any form or language.

BACKGROUND OF THE INVENTION

1. Field of the Invention

The present invention relates to artificial intelligence systems which accept a request for information or action and provide a response, which is based upon at least a partial understanding of the request which may be a natural language statement.

2. Description of the Prior Art

Artificial intelligence systems for processing a natural language statement to determine the meaning of the statement are known. These systems typically are designed as software to fully parse and categorize input language statements. Typically, the prior art natural language processing systems function in a manner analogous to the diagramming of sentences to determine the functions of the various words in the context in which they are used (noun, verb, participle, etc.). These systems determine the meaning of a statement based upon the recognition of words and the place in which they occur in the statement. A dictionary is typically used which defines each word that can be accepted, the parts of speech that each word in the dictionary can assume and the rules which govern the processing of the part of speech which the word has assumed. Once a statement has been parsed to the best of the program's ability, the program attempts to translate the statement into a computer language which can be translated into machine instructions.

The following list of publications is representative of the current state of the art of artificial intelligence systems for processing natural language statements:

Barr, A., Edward A. Feigenbaum, eds., Vols. 1 and 2, 1981; Paul R. Cohen and Edward A. Feigenbaum, eds., Vol. 3, 1982. Los Altos, CA: William Kaufmann, Inc.

Hayes-Roth, F., D. A. Waterman, D. B. Lenat, 1983, Building Expert Systems, Reading, Mass: Addison-Wesley Inc.

Koesldki, R., 1979, Logic for Problem Solving, Artificial Intelligence Series, New York: North-Holland Minsky, M. 1963. Steps toward artificial intelligence. Computers and Thought. New York: McGraw-Hill Winston, P. H., 1984, Artificial Intelligence, Reading, Mass: Addison-Wesley Inc.

Each of these publications presents a description of the architecture and design of natural language processor machines and also contain extensive bibliographies.

Prior art systems of the aforementioned type have several disadvantages as follows:

(1) It is assumed that the speaker uses correct syntactic and semantic forms of natural language. As a practical matter, this assumption varies from person to person.

(2) It is assumed that all possible rules for statement decomposition can be identified and catalogued in the dictionary. In fact, especially with languages such as English, there are too many exceptions to the rules to provide an all inclusive meaningful rule base.

(3) These systems require large amounts of processor operations and a large amount of storage to process each statement into the computer language. The storage requirements for the dictionary and rules base are large as a consequence of the fact that the entire supported vocabulary must be stored in the dictionary.

(4) If a statement cannot be parsed correctly, a wrong meaning will be given. There is no straightforward manner in which to communicate the misunderstanding of the input statement to the person.

(5) The language understanding process is dissociated from the machine process for determining meaning of input statements for the reason that there is typically no meaningful interaction between the user and the system.

The prior art artificial intelligence natural language processing systems have virtually no interaction between the user and the artificial intelligence system after the inputting of the statements to be analyzed. These systems provide a limited degree of interaction with the user in that they will output a statement that a word or words in the input statement are not recognized in the dictionary of words which are stored in memory. However, outside of this type of output, the prior art systems do not request additional statements to be inputted to augment the current understanding of the statement being processed. As a result, the meaning of a natural language statement is determined entirely from the statement itself which can result in erroneous meanings because of the limited amount of information conveyed by the statement.

Current knowledge bases, which are a form of artificial intelligence systems, consist of explicitly declared rules which are used to determine the response which is appropriate when a specific set of facts exists. The facts are usually gathered via a yes/no dialogue with the person. As facts are gathered, they are processed against the rules to determine the next appropriate action to be taken. These rules in prior art knowledge bases are recorded in the form of a language which generally takes the form: if (a) is true and (b) is true than (c) is a new fact or a new process to be executed. The language used to state these rules varies from an English-like programming language at one extreme to a very cryptic and difficult LISP programming language. Responses are generally stored in the knowledge base in a different form.

Current knowledge base designs have the following disadvantages: (1) It is difficult to formulate and state the rules which are used to formulate facts and to continue processing through the knowledge base. (2) Processing the rules against the current set of facts consumes a large amount of machine cycles. (3) Storage space for the rules is large. (4) The management of the knowledge base data is complex. (5) Natural language processing and response processing are separate and distinct phases of processing, increasing the system complexity and reducing the functionality of the system.

GLOSSARY

The following definitions define terms used throughout the specification and claims:

1. Statement—Binary codes or analog signals which establish a specific request for action on the behalf of the system controller. Statements may take (but not limited thereto) the following forms: natural language statements such as sentences; a predefined computer program to computer program communications protocol and command set; and a predefined machine to computer analog signal protocol and command set. An initial statement is the statement to be analyzed to determine its meaning and to which a response (which is based upon at least a partial understanding of the statement) is to be given. Additional statements are statements inputted in response to inquiries for additional information to assist in the determination of the meaning of the initial statement.

2. Concept—The understanding represented by an addressable node in a knowledge base which reflects at least a partial understanding of an initial statement. A current concept is associated with a node of information being currently processed. A new concept is associated with a node which is identified by a node pointer associated with a set of patterns which contains a pattern which has been matched with a statement. Concepts are used to design a knowledge base having a plurality of addressable nodes. Each node has an associated concept which is used to design patterns which are to be matched with the initial statement and any additional statement.

3. Inquiry—A request for an additional statement to be inputted to assist in the determination of the meaning of the initial statement where insufficient information or ambiguities exist such that a new concept cannot be identified from the statements currently stored.

4. Response—An output which is appropriate to the user's request and based upon at least a partial understanding of the input statements which is optionally stored at each node in the knowledge base. A response may be textual in nature to be understandable by humans or in the form of commands or information for use by a machine. A final response defines the highest level of understanding of the initial statement which can be identified within a knowledge base.

5. Solicitation—An output from the controller stating that an initial statement should be inputted.

6. Pattern—An expression which is used to identify similar, but not necessarily equal parts of a statement to determine concepts contained in a statement. Typically, more than one pattern is used to identify a concept.

SUMMARY OF THE INVENTION

The present invention is an improved artificial intelligence system for determining the meaning of statements and providing a response which is based upon at least a partial understanding of the input statements. The invention is applicable to the processing of natural language statements, as well as determining the meaning of loosely defined, related, or multiply defined computer languages. The invention is also applicable to the processing of natural language statements, as well as determining the meaning of complex logical problems of the type which may be processed as a set of rules. Moreover, the invention is applicable to the determination of the meaning of statements which are mixtures of similar but independently defined communications languages.

The present invention is a significant departure from the prior art as described above. An initial input statement is processed to determine its meaning by establishing a hierarchy of concepts which are embodied in the statement. The invention first establishes the central concept of the initial statement whether it is a declaration or a question. The invention interacts with the user (either a person or another machine) to resolve any information gaps, contradictions and ambiguities necessary to reach a final meaning by providing inquiries to be answered by the user in the form of additional statements which are added to the initial statement and processed in conjunction with the initial statement to resolve the aforementioned information gaps, contradictions and ambiguities. Prior to the statement of the final response, the invention may provide intermediate responses which are apropriate to the user's request and are based upon at least a partial understanding of the meaning of the input statements. As the meaning of the initial input statement becomes more clearly understood, through continued processing, including the optional inputting of additional input statements in response to queries, the optional intermediate responses become more specific to the final meaning of the input statements.

The overall processing performed by the present invention is analogous to a continuous train of thought produced by human beings in solving diverse problems. The identification of each new level of the meaning of the initial input statement represents a new concept which represents a new level of understanding of the initial statement in terms of information stored at a node in the knowledge base associated with the current concept. Finer and finer concepts are identified by continued processing including the optional inputting of additional statements until the initial statement is fully understood or until it is determined that information is missing or ambiguous. If inquiries to the user produce additional statements which are usable to resolve the ambiguities, a final concept of the initial input statement is identified. The response stored at the node in the knowledge base associated with the final concept is the final response.

Any additional statements inputted in reply to queries for additional statements are added to the initial statement to provide an augmented body of input information to be used in determining the final meaning of the initial statement. This body of knowledge is preferably stored in the form of a list of statements with the list of statements being matched with one or more sets of patterns which are optionally stored at each node in the knowledge base to determine if a match exists which is used to identify a new concept of the initial statement. Each set of patterns contains one or more patterns which are used to identify similar but not necessarily equal parts of the initial statement to determine a new concept contained in the statement. Typically, more than one pattern is used to identify a new concept with each pattern within a set of patterns identifying the same new concept.

The present invention has advantages over the prior art as described above. (1) It does not depend upon statement syntax to determine the meaning of the statement. Statements are analyzed as a whole without regard to grammatical structures. (2) It does not rely upon a dictionary of known terms and grammatical constructions to understand the meaning of a statement. The usage of a dictionary and grammatical constructions to understand the meaning of a statement limits the ability of the prior art systems to provide accurate meanings of an input statement, and increases the overall storage requirements of the system. (3) It can enter into a natural dialogue with a person or another machine to resolve ambiguities and obtain additional input statements which are useful in determining the final meaning of the initial statement. (4) The understanding of additional input statements is an integral part of determining a final meaning of the initial input statement.

The present invention utilizes a knowledge base which is table oriented in a plurality of addressable nodes. Decision logic is implicit in the structure of the knowledge base. The identification of a new concept is accomplished by the matching of a pattern within a set of patterns with some part of a statement within the list of statements. Each set of patterns contains a pointer which identifies the new concept which is associated with a new node. The identification of the new concept in the form of a pointer to a new node in the knowledge base is passed from a pattern matcher to the controller to point to the new node at which further processing of the initial statement is to occur. At each new node in the knowledge base, dialogue in the form of inquiries may be stored and may be used to gather additional statements to be used for continued matching of the list of statements against the sets of patterns stored at the current node to identify a new concept. Textual information is also available from the knowledge base to assist the user upon the entry of a help command on an input unit.

An artificial intelligence system in accordance with the present invention for accepting a natural langauge statement, understanding the meaning of the natural language statement and making a response to the natural language statement based upon at least a partial understanding of the input statements includes an input device for providing an initial natural language statement and additional natural language statements which provide information for determining the final meaning of the initial natural language statement; an output device for providing a response to the initial natural language statement and any inquiries requesting additional natural language statements to be inputted on the input; a knowledge base having a plurality of addressable nodes, each node representing a current concept of the initial natural language statement and having stored thereat either zero patterns or, if any, at least two sets of patterns with each set of patterns identifying a distinct new node within the knowledge base where a new concept of the initial natural language statement is represented and, optionally, a response based upon at least a partial understanding of the natural language statements and the new concept of the natural language statements augmenting the current and previous concepts and additionally optionally identifying a final concept; a storage medium for storing the initial natural language statement and each additional natural language statement and any sets of patterns fetched from the node of the knowledge base associated with the current concept; a pattern matcher for matching the initial natural language statement and each additional natural language statement which has been inputted by the input with sets of patterns which are retrieved from the node associated with the current concept to determine when a match occurs between any of the stored natural language statements and any one of the patterns within the sets of patterns for identifying the new concept associated with the matched pattern, and a controller for controlling the inputting of natural language statements, the outputting of any response to the natural language statements and any inquiries requesting the input of additional natural language statements, the storage of the natural language statements and patterns fetched from the node associated with the current concept by the storage medium, the transmission of the natural language statements and any patterns from the node associated with the current concept from the storage means to the pattern matcher and the transmission of an identification of the new concept to the controller.

Further in accordance with the invention, the pattern matcher also determines if no match exists between the natural language statements and any of the patterns or sets of patterns stored at the node associated with the current concept; the storage medium for storing also stores additional natural language information from the node associated with the current concept to be outputted by the output as a natural language inquiry for additional natural language statements to be inputted by the input; and the controller causes the outputting of the natural language inquiry when no match is determined.

Further in accordance with the invention, each node of the knowledge base may also store additional natural language information distinct from any natural language responses or natural language inquiries for assisting a user; and the controller causes the additional natural language information to be outputted by the output in conjunction with the inputting of a request for assistance.

Preferably, the natural language statements are stored in the storage medium in the form of a list in the order of their input and the matcher matches the list of statements in a last in/first out manner with the sets of patterns.

A new concept may be assumed by default when no match occurs between the list of statements and the sets of patterns at the current node.

While the present invention is preferably used for the processing of natural language statements, it should be clearly understood that it is applicable to analyzing other types of statements to determine their meaning and responding accordingly.

A machine implemented process in accordance with the invention for accepting an initial statement inputted by an input device, understanding the statement and making a response on an output device to the statement based upon at least a partial understanding of the statement comprises processing the initial statement inputted on the input device by matching with a knowledge base to establish a first concept thereof; providing one or more inquiries on the output device which request the inputting of one or more additional statements on the input device to resolve information deficiencies or ambiguities necessary to determine the response to the initial statement; processing the initial statement and the additional statements by matching with the knowledge base to establish an additional concept which is more specific than any previous concept; repeating the providing of inquiries and processing of the initial and additional statements steps until a final concept of the statements is established which is the most specific concept that can be established by matching with the knowledge base; and outputting on the output device a response assuciated with the final most specific concept. Furthermore, one or more responses may be outputted on the output device which are associated with each additional concept prior to outputting a response associated with the final most specific concept.

BRIEF DESCRIPTION OF THE DRAWINGS

FIGS. 3A-3C are a diagram of a state machine for implementing the system controller.

FIGS. 4A and 4B are a simplified flowchart which illustrates the dominant sequence of processing of information stored at each of the nodes in the knowledge base.

DESCRIPTION OF THE PREFERRED EMBODIMENT

The present invention is an improved artificial intelligence system which determines a final meaning of input statements which is at least a partial meaning of the input statements by a iterative process in which a final concept of an initial statement is determined by successively forming intermediate concepts which approach the final concept of the initial statement and provides a response which is appropriate to meaning of the input statements. The initial statement and any additional input statements inputted in response to inquiries are matched against patterns stored in the knowledge base from the node associated with the current node to identify a new concept within the knowledge base which optionally has stored thereat a statement of the intermediate meaning of the input statements or when no match occurs to cause an inquiry to be outputted to request the inputting of further additional statements to augment the list of statements in subsequent matching between the list of statements and other sets of patterns within the knowledge base.

Figure 1:
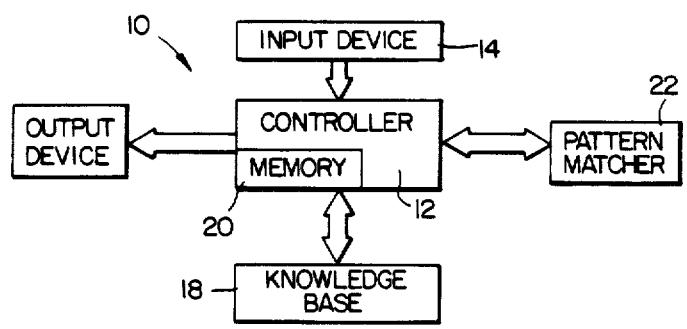
FIG. 1 is a system diagram of the present invention.

FIG. 1 illustrates the primary parts of the present invention 10. A controller 12 is provided for controlling the flow of information throughout the system as described below. Preferably, the controller 12 is in the form of software implementing a state machine as described below. An input device 14, which may be of any known type, including a source of data from another machine or merely a terminal is provided for the inputting of an initial statement to which a response appropriate to a final meaning representing at least a partial meaning is to be given and additional statements which provide information for determining the final meaning of the initial statement. An output device 16 is coupled to the controller 12 for providing any response to the input statements appropriate to a current meaning of those statements which is optionally at any one of the nodes within the knowledge base 18 and any inquiries requesting the inputting of additional statements to be inputted on the input device 14. The knowledge base 18 is coupled to the controller 12 to provide information for storage in a storage medium 20 of any known design to be processed in a manner described in detail below in conjunction with FIGS. 3A, 3B and 4A, 4B and 4C. It should be understood that the invention is not limited to the storage medium being part of the controller and, in fact, may be a separate piece of hardware or part of the memory of a general purpose digital computer. A pattern matcher 22 is coupled to the controller to perform pattern matching to be used in identifying new concepts within the knowledge base 18 as described below. Preferrably, the pattern matcher 22 is in software.

I. Knowledge Base Design

Figure 2:
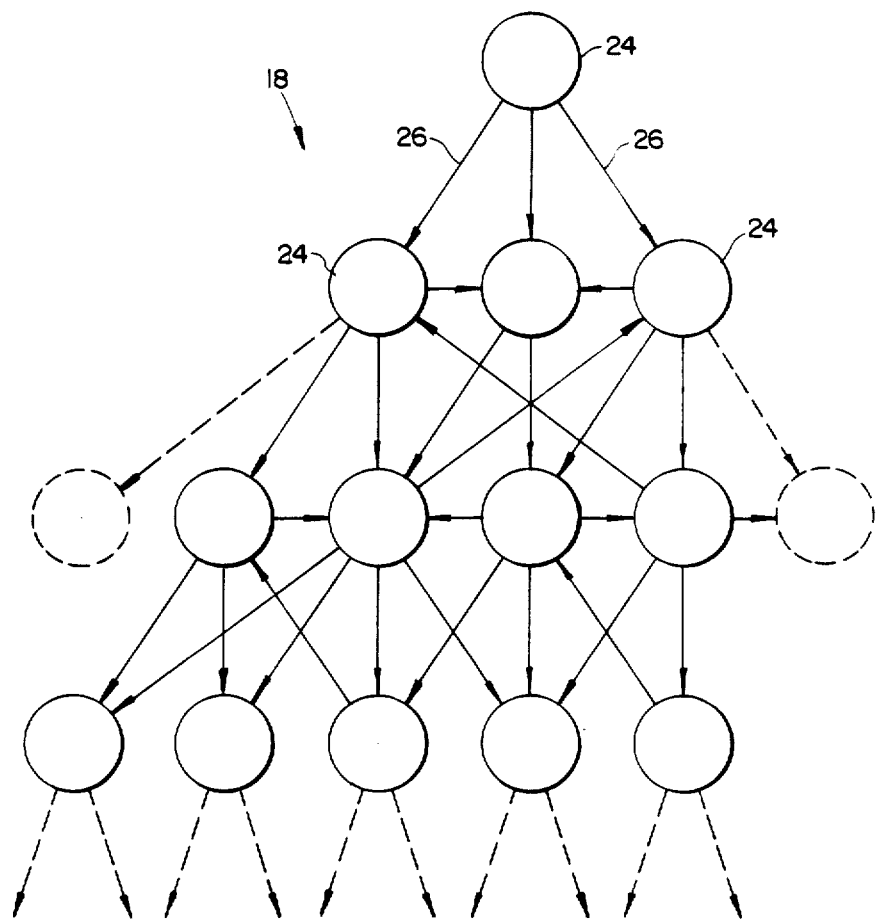
FIG. 2 illustrates conceptually the relationship of the nodes in the knowledge base.

The structure of the knowledge base 18 is described with reference to FIG. 2 which provides a conceptual diagram of the relationship of the interrelationship of the nodes 24. The knowledge base 18 is comprised of a plurality of nodes 24 which is not limited to the essentially descending tree as illustrated. Additionally, nodes as illustrated by dotted lines may be added. Each node is an addressable storage area from which stored information can be fetched for producing outputs on the output device 16 in the form of optional responses and optional inquiries to be used to seek the inputting of additional statements, patterns to be compared with the lists of statements stored in the storage medium 20 by the pattern matcher 22, node pointers 26 which identify new concepts associated with nodes, solicitation information for the initiation of processing and information for assisting users. Each node contains either zero patterns or, if any patterns, at least two sets of patterns. Each set of patterns stored within a particular node 24 has an associated node pointer 26 which identifies a new concept as represented by another node within the knowledge base 18 if a pattern within that set of patterns is matched by the pattern matcher 22 with a statement. The node pointer 26 is passed from the pattern matcher 22 to the controller 12 when a statement from the list of statements is matched with one of the patterns within the set of patterns being matched with the list of statements. The list of statements is formed from the initial statement and each additional statement which has been inputted by the input device 14 in reply to an inquiry are being processed. When a match is determined, the node pointer 26 associated with the set of patterns which contained the matched pattern is passed from the pattern matcher 22 to the controller 12 to identify a new concept associated with the node identified by the node pointer 26 which has been passed. Nodes 24 in the knowledge base 18 are continually processed until no further sets of patterns are available to be processed at which time a final meaning of the initial input statement in the form of a response is provided by the output device 16.

II. Pattern Matcher

The pattern matcher 22 is programmed logic, which preferably is software, that accepts a list of statements obtained from the user including the initial statement and any additional statements provided in response to inquiries and sets of patterns retrieved from the node 24 in the knowledge base 18 associated with the current concept to perform matching of the statements from the sets of patterns to either identify if a match is present within one of the retrieved sets of patterns or if no match is present. The identification of a match between the list of statements and one of the patterns within a set of patterns identifies a new concept in the knowledge base by means of the node pointer 26 which is passed to the controller 12. If no match can be found between the lists of statements and the sets of patterns, any inquiries stored at the node associated with the current concept are outputted to seek the input of additional statements to augment the list of statements to be further processed. If a further matching using the augmented list of statements at the node associated with the current node 24 does not reveal any match, the pattern matcher 22 returns a null node pointer 26 to the controller 12 which causes the controller to return to the node associated with the initial concept.

The following pattern matching symbols may be used for performing pattern matching in a known software language with the present invention. Each symbol has a meaning relating to what words, if any, may be considered a "match" when the symbol is used as a word in the pattern. Similarly, each symbol has a meaning relating to what characters, if any, may be considered a "match" when the symbol is used as a character in the pattern.

| Symbol | Meaning |
| --- | --- |
| * | allow any number of words or characters (including zero) to fill this position in the sentence or word. |
| # | Allow zero or one word or a character to fill this position in the sentence or word. |
| + | Allow one and only one (not zero) word or character to fill this position in the sentence or word. |

The following set of patterns are used to illustrate the use of these symbols. In this example, the pattern is trying to identify three keys on an IBM/PC keyboard. The concepts that are established indicate that the user would like a comparison of some sort. This set of patterns is used to establish that the user wants a comparison of the results of holding down the Shift key and pressing the PrtSc key or holding the Ctrl key and pressing the PrtSc key. The user may have stated the initial statement using a variety of words to identify these keys. The keys are actually labeled "Ctrl", "Shift", and "PrtSc" on the keyboard. In the initial implementation of the pattern matcher 22, letter case is disregarded.

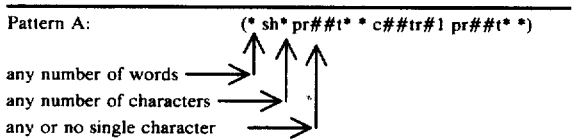

Pattern A: (* sh*pr##t* * c##tr#1 pr##t* *)
any number of words
any number of characters
any or no single character This pattern would match against a statement with any number of words preceeding a word beginning with "sh". If such a word were encountered, it could end with any number of any kind of characters. The pattern has established a probability that the word is "shift". The very next word must begin with "pr" and may have up to two letters preceeding a "t". That word may end with any number of characters. These conditions may be met by (but are not limited to) the following phrases:
shift print
shift prt
shift prtsc
shift prts
sh prts
sh prt If the above conditions are met, the rest of the pattern will be used to continue the matching. The "shift print" match may be followed by any number of words leading to a word beginning with "c" followed by zero or up to two characters, followed by "tr" followed by zero or up to one additional character, followed by "1". These conditions may be met by (but are not limited to) the following phrases:

control
ctrl
cntrl

Assuming that the statement has matched so far, the matching continues by trying to establish the word "print" or something close, such as:
print
prt
prtsc
prts

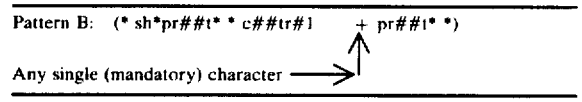

Pattern B: (* sh*pr##t* * c##tr#1 + pr##t* *)
Any single (mandatory) character

This pattern is similar to the one above but it is oriented towards the words being run together. It first looks for something like:
shprtsc
shiftprint
shift-printsc
shift-prtsc If it matches this pattern, it will allow any number of words until it encounters a word beginning with "c". The second part of the pattern will match on phrases like:
control-print
ctrl-prtsc
control-prtsc
ctrl-prt Notice the "+" sign in the second part of this pattern. It established that the "control" term must be connected with the "prtsc" term by some character other than a blank. They cannot be separate words.

Pattern matching of a list of statements with patterns within sets of patterns in the present invention is preferably implemented in software by the aforementioned symbols as exemplified by the patterns A and B above but is not limited thereto. A "match" is detected when a whole pattern has been detected in one of the statements within the list of statements comprised of the initial statement and any additional statements.

III. Controller

The controller 12 functions to ensure that the input device 14, output device 16, knowledge base 18, storage medium 20 and pattern matcher 22 interact to produce an artificial intelligence system 10. In the preferred form of the invention, the controller is a state machine which identifies the current concept associated with one of the nodes 24 of the knowledge base 18 which is the source of patterns and other information being processed currently. The state machine is preferably implemented in programming in the form of software. The logic embodied in a state machine is described with respect to FIGS. 3A–3C. FIGS. 3A–C represent a transition table which identifies a new state of the controller 12 as a function of the parameters "patterns", "default concepts", "statements", "concepts", requests for "help" and a command to "end" processing.

The following rules apply with reference to the parameters of the state machine in FIGS. 3A–3C. When new patterns are established, concepts become old. When new concepts are established, statements become old. When new concepts are established, defaults become old. When a new default is established, statements become old. When concepts are searched, patterns become old.

The state machine of FIGS. 3A-3C has three types of input accepting states. The columns identified by the letter "A" indicate that the state machine will accept information from the knowledge base 18. As described above, the knowledge base at each particular node 24 may have stored therein and therefore may deliver to storage medium 20 patterns, a default concept, neither patterns nor a default concept, both patterns and a default concept, optional information for forming inquiries, optional information for responding to a request for help, and an optional response. As has been described above, whenever a response is stored at a node 24 in the knowledge base 18, the identification of that node with a node pointer 26 causes the response to be outputted on the output device 16.

A type B accepting state indicates that the state machine will accept information from the pattern matcher 22. When a match is detected between one of the statements within the list of statements and one of the patterns within a new pattern, the node pointer 26 is delivered to the controller 12 identifying a new concept. If the pattern matcher 22 is unable to detect a match, it returns a null node pointer indicating no new concept has been identified.

A type C accepting stated indicates that the state machine will accept inputs from the user via the input device 14. As explained above, the source of the initial statement and any additional statements which are inputted may be from a person or a machine. In an attempt to identify a new concept associated with a node 24 in the knowledge base 18, the present invention accepts one or more input statements from the person which are in reply to inquiries outputted on the output device 16 when initially no match can be found between the list of statements and any of the patterns stored in the sets of patterns at the node associated with the current concept.

The transition table for the controller 12 is written in the known "C" language. In the "C" language, a "SWITCH control flow operator" is used to implement the controller. The overall table is implemented as a switch with each state (0-19) being implemented as a CASE within the switch. The transition between the various states controls the flow of information within the system as described above with reference to FIG. 1. For example, with reference to FIGS. 3A-3C, if the state machine is in state "0", only "A" type inputs can be accepted. The presence of patterns from the storage medium 20 will cause the state machine to "switch" to state 14. The presence of a default concept stored within the storage medium 20 will cause the state machine to switch to state 12. The presence of neither patterns nor default concepts from the storage medium 20 will cause no transition from the zero state. The presence of both patterns and default concepts from the storage medium 20 will cause the transition of the state machine to state 16. Moreover, for example with reference to the aforementioned transition to state 14, state 14 is used only for accepting inputs from the user which include statements, a request for help or the stop command. Similarly, each of the states in the transition table is reached from another previous state by a particular combination of "A", "B" or "C" type inputs. The transition from one state to another state controls the transmission of information between the various parts of the system as described above with regard to FIG. 1. Finally, with reference to FIGS. 3A-3C, those rectangular blocks within the transition table labelled by "E" represent error states which should not be present. The presence of the set of conditions which causes the error condition will produce an erroneous new state which should not be entered.

Figure 4B:
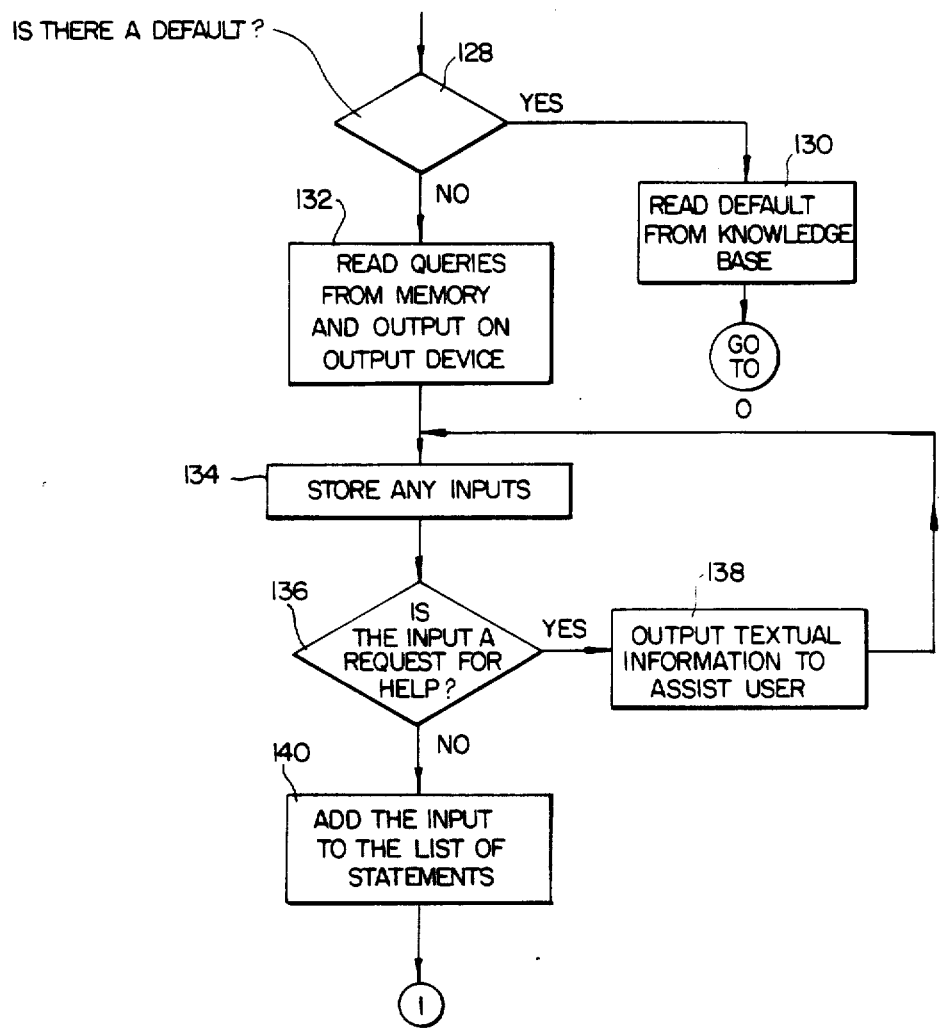

FIGS. 4A-4B illustrate a flowchart useful for describing the overall processing of information stored at any one of the nodes 24 within the knowledge base 18. It should be further understood that the present invention is not limited to the precise manner of information transfer described in FIGS. 4A and 4B. The primary purpose of FIGS. 4A and 4B is to conceptualize the temporal processing of information that occurs with the artificial intelligence system of the present invention at particular nodes 24 in the knowledge base 18. The processing at any particular node 24 starts at starting point 100 and proceeds to point 101 where the "starting" node in the knowledge base 18 is read into the memory 20. The starting node is the entry point into the knowledge base. The processing proceeds to point 102 where the storage medium 20 is read to output any response stored thereat which has been fetched from the node 24 associated with the current concept. Information processing proceeds to point 104 where a determination is made if there are any patterns stored at the current node 24. If the answer is "no", information processing branches to point 106 where a determination is made if there are any defaults. If the answer is "no" at decision point 106, the program branches to point 108 which signifies that a final meaning of the initial input statement has been determined. The situation where the answer is "yes" at decision point 106 will be described below. If the answer is "yes" at decision point 104, the information processing proceeds to point 110 where a pointer identifying the set of patterns currently being processed by the pattern matcher 22 is set to 1. The information processing proceeds to point 112 where the set of patterns identified by the set pattern pointer is read from the storage medium 20 for processing by the pattern matcher 22. The information processing proceeds to point 114 where the list of statements including the initial statement and any additional statements is read from the storage medium 20 for processing by the pattern matcher 22. The information processing proceeds to point 116 where a comparison is made between the set of patterns which has been read and the list of statements to determine if there is a match with the comparison processing of statements from the list of statements being performed on a last in/first out basis. The information processing proceeds to decision point 118 where a determination is made if a match has been detected. If the answer is "yes" at decision point 118, the information processing branches to point 120 where the node 24 pointed to the node pointer 26 associated with the set of patterns which contains the pattern which was matched with the list of statements is read to thus identify a new concept. The processing loops back to entry point "0" which immediately preceeds point 102. If the answer is "no" at decision point 118, the information processing proceeds to decision point 124 where a determination is made if the set pattern pointer is equal to the number of sets stored at the node associated with the current concept. If the answer is "no" at decision point 124, information processing branches to point 126 where the set pattern pointer is augmented by 1. Information processing proceeds from point 126 back to point 112 described above where the next set of patterns is read from the storage medium 20 to continue the pattern matching operation by the pattern matcher 22. If the answer is "yes" at decision point 124, the program proceeds to decision point 128 where a determination is made if there are any defaults. If the answer is "yes" at decision point 128, the information processing branches to point 130 where the default is read from the knowledge base 18. The processing loops from point 130 back to entry point "0" as discussed above. If the answer is "no" at decision point 128, information processing proceeds to point 132 where the queries stored in the storage medium 20 which have been fetched from the node associated with the current concept are outputted on the output device 16. The information processing proceeds to point 134 where any inputs which have been received from the input device 14, which may be additional statements or a request for assistance, are stored. The information processing proceeds to point 136 where a determination is made if the inputted information is a request for assistance. If the answer is "yes" at decision point 136, the information processing branches to point 138 where textual information stored in the storage medium 20 which has been fetched from the node 24 associated with the current concept is outputted on the output device 16 to provide the user with assistance. The information processing branches from point 138 back to point 134 as previously described. If the answer is "no" at decision point 136, the information processing branches to point 140 where the statement inputted on the input device 14 is added to the list of statements which are processed by the pattern matcher 22 to determine if any matches exist between the statements and the set of patterns being processed. The information processing branches back to entry point "1" which immediately preceeds decision point 104 described above.

The information processing described above with reference to FIGS. 4A and 4B illustrates how for each successive node 24 of the knowledge base 10 the initial statement is augmented by the storage of additional statements which in conjunction with the initial statement are successively processed against different sets of patterns stored at other nodes in the knowledge base 18 to arrive at a final meaning of the initial statement.

IV. EXAMPLE

The following example illustrates the use of the present invention to process natural language statements to respond to requests for information regarding the usage of MICROSOFT DOS for the IBM/PC and compatibles. This example is explained with reference to the transition table for the state machine of FIGS. 3A-3C and with reference to distinct nodes in a knowledge base 18. Successive nodes are identified by ascending numbers which do not have any correlation with the nodes 24 of FIG. 2. Patterns are identified by text set off with parenthesis in which pattern matching symbols described above are used as operators such as match=((+)). The identification of a node pointer 26 is signified by the words "next=node" and a number contained in parenthesis such as next=(node 2). A concept is identified by text "concept=( )" such as "concept=(dos)". A node pointer "next=(xxxxx)" identifies an irrelevant branch for purposes of this example.

The initial starting conditions are as follows:
State=0 and the prestablished starting node=node 1.
Node 1 is fetched from the knowledge base 18 and is stored in storage medium 20. Node 1 contains the following information:

The initial concept is the start of processing.
The following solicitation is outputted from the output device 16.
"How may I help you?"
In response, the user presses the HELP key on the input device 14 which causes the following textual information to be outputted from node 1.

"Hello, my name is ALVIN. I know all about MICROSOFT DOS for the IBM/PC and compatibles.

I am a pretty smart fellow and can understand English. If you talk to me in simple English sentences, I will be able to understand you just fine and can help you use DOS to its full potential. Please do not use contractions.

If I am not sure, but need to know more to understand the situation, I will ask you a question or two. If you are not sure what to respond to one of my questions, enter HELP and I will give you some information which may help us proceed.

If you get stuck, or need to find out something more to answer one of my questions, you can change the topic or end the conversation, by entering END or EXIT in reply to any question. END will terminate the current conversation and start a new one. EXIT will terminate the session.

You might begin by asking me 'How do I get started?' Thank you for asking."
The following patterns are stored at node 1:
opt1.match=( (* *dos *))
opt1.next=(node 2)
opt2.match=( (* you# *) (* ALVIN *))
opt2.reject=( (*you mean*))
opt2.next=(node 100)
opt3.match=((*))
opt3.next=(node 2)

For example, if the user had inputted an initial statement "DOS", the pattern matcher 22 would deliver a node
inter 26 pointing to node 2 in the knowledge base 18.
Similarly, if a "match" and "reject" operation were detected in the initial statement as identified by "opt2", the pattern matcher 22 would have returned a node pointer to node 100 to the knowledge base 18.

The inputting of the patterns stored at node 1 causes the transition of the state machine of FIGS. 3A-3C to state 14.

The outputting of the solicitation occurs which stored at node 1 as described above
"How may I help you?"
The user answers back with the initial statement
"How do I get started?"
The initial statement causes the state machine to shift to state 7 as set forth in FIGS. 3A-3C.

The list of patterns stored at node 1 and the initial statement is delivered to the pattern matcher 22 where they are compared. The pattern matcher 22 matches option 3 to the statement and the pointer to node 2 is returned to the controller. The establishment of a match causes the state machine to shift to state 3.

The information from node 2 is fetched from the knowledge base 18 and is stored in the storage medium 20.

Node 2 contains the following information:
concept=(dos)
opt1.match=((+))

opt1.next=(xxxxx)
opt2.match=((* how *))
opt2.next=(node 3)
opt3.match=((* why *))
opt3.next=(xxxxx)
opt4.match=((* where *))
opt4.next=(xxxxx)

The fetching of the patterns from the node 2 in the knowledge base causes the state machine to shift to state 8.

The list of patterns and initial statement is delivered to the pattern matcher 22. The pattern matcher 22 matches option 2 to the statement which causes the pointer 26 to node 3 to be returned to the knowledge base 18. The finding of a match establishes a new concept which causes the state machine to change state to state 3. The information stored at node 3 is fetched from the knowledge base 18.

concept=(how)
query=(Please explain your requirements further.)
Assistance information=(If you are unsure how to operate IMB PC/DOS, please describe the task you would like to accomplish or the command you would like to use. Thank you.)
Patterns to be matched:
opt1.match=( (* how do dos *) (* how be *) )
opt1.next=(xxxx)
opt2.match=((* how do *)(* how are *)(* how to *))
opt2.next=(node 4)
opt3.match=((* how big *))
opt3.next=(xxxxx)
opt4.match=((* how # can *))
opt4.next=(xxxx)

The inputting of patterns as set forth above from the storage medium 20 of the material fetched from node 3 causes the state machine to change state to state 8. The list of patterns set forth above and the user statement is delivered to the pattern matcher 22. The pattern matcher 22 matches option 2 to the initial statement and the node pointer 26 pointing to node 4 is returned to the controller 12. The establishment of a concept by making a match causes the state machine to change state to state 3. The information stored at node 4 is fetched from the knowledge base 18. Node 4 contains the following information:

concept=(do)
opt1.match=((* i use a *)(* i use the *))
opt1.next=(xxxx)
opt2.match=((* stop* *)(* break out *))
opt2.next=(xxxx)
opt3.match=((* syntax *)(* select* *)(* write the *))
opt3.next=(xxxx)
opt4.match=((* start* *))
opt4.next=(node 5)
opt5.match=((*))
opt5.next=(xxxx)

The inputting of patterns as set forth above from the storage medium 20 of the material fetched from node 4 causes the state machine to change state to state 8. The list of patterns and user initial statements has been delivered to the pattern matcher 22. The pattern matcher 22 matches option 4 to the initial statement and the node pointer 26 pointing to node 5 is returned to the controller 12. The establishment of a concept by making a match causes the state machine to change state to state 3. The information stored at node 5 is fetched from the knowledge base. Node 5 contains the following information:

concept=(start)

The following inquiry from node 5 is stored in the storage medium 20:

"I believe you want to start something. But, either I cannot identify for certain what it is or I do not have the information you are looking for. Just in case I could not identify the term that was entered, please check the spelling. If that seems OK, try a similar word or phrase. Maybe I can recognize a synonym.

In case my misunderstanding is not of a term, but a concept, please try to think of a broader or a narrower category and ask about that. Thank you for being patient with me."

The following assistance information from node 5 is stored in the storage medium 20.

"Please name the object you would like to start. If I know how to start it, I will explain the process to you. Thank you."

The following patterns from node 5 are stored in the storage medium 20.

opt1.match=( (* start *dos *) )
opt1.next=(node 101)
opt2.match=( (* start basic *) )
opt2.next=(node 103)
opt3.match=( (* restart *dos *) (* restart * system *) )
opt3.next=(node 640)
opt4.match=( (* software * auto* *))
opt4.next=(node 610)
opt5.match=((*))
opt5.next=(node 6)

The inputting of patterns as set forth above from the storage medium 20 of the material fetched from node 5 causes the state machine to change state to state 8. The list of patterns and user initial statement has been delivered to the pattern matcher. The pattern matcher 22 matches option 5 to the initial statement and the node pointer 26 to node 6 is returned to the knowledge base 18. The establishment of a concept by making a match causes the state machine to change state to state 3. The information node 6 is fetched from the knowledge base 18. Node 6 contains the following information:

concepty=(get started)

The following inquiry from node 6 is stored in the storage medium 20:

"The best way to get started is, first, ask me about ALVIN, then ask me about DOS.

As we proceed, you can help our conversation along—without words—as people often do. The Function Keys listed on the control panel are set for the meanings indicated, so instead of saying "YES" by typing and entering the word, you can just nod "YES"- by touching the F9 key, say "NO" with F10, or ask for HELP with F1.

Should I explain more about myself and how I work or should I tell you about IBM/PC DOS."

The following assistance information from node 6 is stored in the storage medium 20.

"Please enter .nuALVIN.nn or .nuDOS.nn. Thank you."

The following patterns from node 6 are stored in the storage medium 20.

opt1.match=( (* you* *) (* alvin *) )
opt1.next=(node 7)
opt2.match=( (* *dos *) (* system *) )
opt2.next=(xxxx)

The inputting of patterns set forth above from the storage medium 20 of the material fetched from node 6 causes the state machine to change state to state 8. The list of patterns and the user initial statement is delivered to the pattern matcher 22. No match is found by the pattern matcher between the patterns and the initial statement and a null pointer is returned to the knowledge base which does not identify a new concept. The inability to match a pattern with a statement causes the state machine to change state to state 17.

The inquiry stored at node 6 is outputted:
"The best way to get started is, first, ask me about ALVIN, then ask me about DOS.

As we proceed, you can help our conversation along—without words—as people often do. The Function Keys listed on the control panel are set for the meanings indicated, so instead of saying "YES" by typing and entering the word, you can just nod "YES" by touching the F9 key, say "NO" with F10, or ask for HELP with F1.

Should I explain more about myself and how I work or should I tell you about IBM/PC DOS?

Please enter .nuALVIN.nn or .nuDOS.nn. Thank you."

An additional statement is given by the user "ALVIN"

The additional statement "ALVIN" is entered into the list of statements before the initial statement. The input of a statement causes the state machine to change state to state 8. The list of patterns and list of statements is delivered to the pattern matcher 22. The pattern matcher 22 matches option 1 to the additional statement and a pointer 26 to node 7 is returned to the controller. The establishment of a concept causes the state machine to change state to state 3. The information stored at node 7 is fetched from the knowledge base 18. Node 7 contains the following information.

A partial response which is based upon the meaning of the initial statement as currently understood is stored as follows:

"When I am working with people who are most familiar with computers, they seem to have difficulty adjusting to my capabilities and simplicity. They keep trying to understand what commands to give me and what "keywords" I respond to. They tend to use single words or small phrases to try to please the computer. However, like a human, I have trouble understanding fragments of information.

On the other hand, when I am working with computer novices (I especially like young people brought up on Star Wars and Dr. Who), I have no difficulty communicating with them. To them, computers are supposed to speak English. They take me for granted.

The moral of the story is to speak to me as if I were an intelligent person. I am. (A modest one at that.) Here is a list of suggested questions and situations to present to me to get familiar with my capabilities. Have fun.

To get acquainted, ask me
  about myself: who I am and what I know.
  about DOS: what it can do and what facilities are available.
  about different DOS commands and what they are used for.
  or—when you run into a command or concept that you are not familiar with: ask me to explain it to you.
  or—pretend you made a mistake while using DOS: and tell me about it.
  or—ask me to show you an Example of using a DOS command that you are not familiar with.
I enjoy helping people. I hope I can help you enjoy the software you are using."

The node pointer is stored as follows:
opt1.next=(node 2)

The above-quoted response is presented to the user. Since there are no patterns or default concepts, the state machine changes state to state 0. Node 2 is fetched from the knowledge base 18 because the node pointer 26 pointed to node 2. Node 2 contains the following information: The following patterns and node pointers:
concept="dos"
opt1.match=((+))
opt1.next=(xxxxx)
opt2.match=((* how *))
opt2.next=(node 3)
opt3.match=((* why *))
opt3.next=(xxxxx)
opt4.match=((* where *))
opt4.next=(xxxxx)

The following solicitation is stored at node 2:
"What else can I tell you about IBM/PC DOS?"

The following assistance information is stored at node 2:
"If you are not sure how to operate IBM/PC DOS, describe the task you want to do or, if you know it, name the command you would like to use. If you believe you are operating DOS correctly, but the program does not seem to be responding as you predict it should, tell me what your situation is. From details of your description, I will try to focus on the problem and locate concepts that may provide a solution. Thank you."

The inputting of the patterns as set forth above from the storage medium 20 of the material fetched from node 2 causes the state machine to change state to state 14. The question stored in the storage medium is outputted as follows:

"What else can I tell you about IBM/PC DOS?"The user presses the EXIT key which terminates the software program.

The following text is outputted to the user at the time of exit:
"Thank you. I hope I have been helpful today. Please visit again soon."

While the invention has been described in terms of its preferred embodiment, it should be understood that numerous modifications may be made thereto without departing from the spirit and scope as defined by the appended claims.

I claim:

1. An artificial intelligence system for accepting a statement, understanding the meaning of the statement and making a response to the statement based upon at least a partial understanding of the statement comprising:

(a) an input means for providing an initial statement and additional statements which provide information for determining the response to the statement;

(b) an output means for providing any response to the initial statement and any inquiries requesting additional statements to be inputted on the input means;

(c) a knowledge base having a plurality of addressable nodes, each node representing a current concept of the initial statement and having stored thereat either zero patterns or, if any, at least two sets of patterns with each set of patterns identifying a distinct new node within the knowledge base where a new concept of the initial statement is represented and, optionally, a response based upon at least a partial understanding of the initial statement and the new concept of the initial statement augmenting the current and previous concepts and additionally optionally identifying a final concept;

(d) means for storing the initial statement and each additional statement and any sets of patterns fetched from the node of the knowledge base associated with the current concept;

(e) means for matching the initial statement and each additional statement which has been inputted by the input means with sets of patterns which are stored from the node associated with the current concept to determine when a match occurs between any one of the stored statements and any one of the patterns stored within the sets of patterns for identifying the new concept associated with the matched pattern; and (f) a control means for controlling the inputting of statements, the outputting of any response to the initial statement and any inquiries requesting the input of additional statements, the storage of the statements and patterns fetched from the node associated with the current concept by the storage means, the transmission of the statements and any patterns from the node associated with the current concept from the storage means to the means for matching and the transmission of an identification of the new node to the knowledge base.

2. An artificial intelligence system in accordance with claim 1 wherein:
   (a) the means for matching also determines if no match exists between the statements and any of the patterns of the sets of patterns stored at the node associated with the current concept;
   (b) the means for storing also stores from the node associated with the current concept additional information to be outputted by the output means as an inquiry for additional statements to be inputted by the input means; and
   (c) the control means causes the outputting of the additional information when no match is determined.

3. An artificial intelligence system in accordance with claim 1 wherein:
   (a) each node of the knowledge base may also store additional information for assisting a user; and
   (b) the control means causes the additional information for assisting the user to be outputted by the output means in conjunction with the inputting of request for assistance.

4. An artificial intelligence system in accordance with claim 1 wherein:
   (a) the statements are stored in the means for storing in the form of a list in the order of their input; and
   (b) the means for matching matches the list of statements with the sets of patterns in a last in first out order.

5. An artificial intelligence system in accordance with claim 2 wherein:
   (a) the statements are stored in the means for storing in the form of a list in the order of their input; and
   (b) the means for matching matches the list of statements with the sets of patterns in a last in first out order.

6. An artificial intelligence system in accordance with claim 3 wherein:
   (a) the statements are stored in the means for storing in the form of a list in the order of their input; and
   (b) the means for matching matches the list of statements with the sets of patterns in a last in first out order.

7. An artificial intelligence system in accordance with claim 4 wherein:
   (a) the statements are stored in the means for storing in the form of a list in the order of their input; and
   (b) the means for matching matches the list of statements with the sets of patterns in a last in first out order.

8. An artificial intelligence system in accordance with claim 2 wherein a new concept may be assumed by default when no match occurs to identify a new concept.

9. An artificial intelligence system for accepting a natural language statement, understanding the meaning of the natural language statement and making a response to the natural language statement based upon at least a partial understanding of the natural language statement comprising:
   (a) an input means for providing an initial natural language statement and additional natural language statements which provide information for determining the final meaning of the initial natural language statement;
   (b) an output means for providing any response to the initial natural language statement and any inquiries requesting additional natural language statements to be inputted on the input means;
   (c) a knowledge base having a plurality of addressable nodes, each node representing a current concept of the initial natural language statement and having stored thereat either zero patterns or, if any, at least two sets of patterns with each set of patterns identifying a distinct new node within the knowledge base where a new concept of the initial natural language statement is represented and, optionally, a response based upon at least a partial understanding of the initial natural language statement and the new concept of the initial natural language statement augmenting the current and previous concepts and additionally optionally identifying a final concept;
   (d) means for storing the initial natural language statement and each additional natural language statement and any sets of patterns fetched from the node of the knowledge base associated with the current concept;
   (e) means for matching the initial natural language statement and each additional natural language statement which has been inputted by the input means with sets of patterns which are stored from the node associated with the current concept to determine when a match uccurs between any one of the stored natural language statements and any one of the patterns within the stored sets of patterns for identifying the new concept associated with the matched pattern; and
   (f) a control means for controlling the inputting of natural language statements, the outputting of any response to the initial natural language statement and any inquiries requesting the input of additional natural language statements, the storage of the natural language statements and patterns fetched from the node associated with the current concept by the storage means, the transmission of the natural language statements and any patterns from the node associated with the current concept from the storage means to the means for matching and the transmission of an identification of the new node to the knowledge base.

10. An artificial intelligence system in accordance with claim 9 wherein:
   (a) the means for matching also determines if no match exists between the natural language statements and any of the patterns of the sets of patterns stored at the node associated with the current concept;
   (b) the means for storing also stores from the node associated with the current concept additional natural language information to be outputted by the output means as a natural language inquiry for additional natural language statements to be inputted by the input means; and
   (c) the control means causes the outputting of the natural language inquiry when no match is determined.

11. An artificial intelligence system in accordance with claim 9 wherein:
   (a) each node of the knowledge base may also store additional natural language information distinct from any natural language responses or natural language inquiries; and
   (b) the control means causes the additional natural language information to be outputted by the output means in conjunction with the inputting of request for assistance in response to a natural language inquiry.

12. An artificial intelligence system in accordance with claim 9 wherein the additional natural language information is one or more inquiries requesting the inputting of one or more additional natural language statements.

13. An artificial intelligence system in accordance with claim 1 wherein:
   (a) the natural language statements are stored in the means for storing in the form of a list in the order of their input; and
   (b) the means for matching matches the list of statements with the sets of patterns in a last in first out order.

14. An artificial intelligence system in accordance with claim 2 wherein:
   (a) the natural language statements are stored in the means for storing in the form of a list in the order of their input; and
   (b) the means for matching matches the list of statements with the sets of patterns in a last in first out order.

15. An artificial intelligence system in accordance with claim 3 wherein:
   (a) the natural language statements are stored in the means for storing in the form of a list in the order of their input; and
   (b) the means for matching matches the list of statements with the sets of patterns in a last in first out order.

16. An artificial intelligence system in accordance with claim 4 wherein:
   (a) the natural language statements are stored in the means for storing in the form of a list in the order of their input; and
   (b) the means for matching matches the list of statements with the sets of patterns in a last in first out order.

17. An artificial intelligence system in accordance with claim 9 wherein a new concept may be assumed by default when no match occurs to identify a new concept.

18. A machine implemented process for accepting an initial statement, inputted by an input device, understanding the statement and making a response on an output device to the statement based upon at least a partial understanding of the statement comprising:
   (a) processing the initial statement inputted on the input device by matching with a knowledge base to establish a first concept thereof;
   (b) providing one or more inquiries on the output device which request the inputting of one or more additional statements on the input device to resolve information deficiencies or ambiguities necessary to determine the response to the initial statement;
   (c) processing the initial statement and the additional statements by matching with the knowledge base to establish an additional concept which is more specific than any previous concept;
   (d) repeating steps (b) and (c) until a final concept of the statements is established which is the most specific concept that can be established by matching with the knowledge base; and
   (e) outputting on the output device a response associated with the final most specific concept.

19. A process in accordance with claim 18 wherein one or more responses are outputted on the output device which are associated with the additional concept prior to the outputting of the response associated with the most specific concept.

20. A process in accordance with claim 19 wherein the statements are natural language statements.

* * * * *